United States Patent
Kamiya

(10) Patent No.: US 11,975,496 B2
(45) Date of Patent: May 7, 2024

(54) FIBER STRUCTURE BODY AND FIBER-REINFORCED COMPOSITE MATERIAL

(71) Applicant: KABUSHIKI KAISHA TOYOTA JIDOSHOKKI, Kariya (JP)

(72) Inventor: Ryuta Kamiya, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 310 days.

(21) Appl. No.: 17/626,891

(22) PCT Filed: Jun. 22, 2020

(86) PCT No.: PCT/JP2020/024277
§ 371 (c)(1),
(2) Date: Jan. 13, 2022

(87) PCT Pub. No.: WO2021/014851
PCT Pub. Date: Jan. 28, 2021

(65) Prior Publication Data
US 2022/0258436 A1 Aug. 18, 2022

(30) Foreign Application Priority Data

Jul. 19, 2019 (JP) .................. 2019-133709

(51) Int. Cl.
*B32B 5/12* (2006.01)
*B29C 70/24* (2006.01)
(Continued)

(52) U.S. Cl.
CPC .............. *B29C 70/24* (2013.01); *D03D 11/00* (2013.01); *D03D 15/44* (2021.01); *B32B 5/12* (2013.01)

(58) Field of Classification Search
None
See application file for complete search history.

(56) References Cited

U.S. PATENT DOCUMENTS

| 4,790,052 A | 12/1988 | Olry |
| 7,758,946 B2 | 7/2010 | Maki et al. |

(Continued)

FOREIGN PATENT DOCUMENTS

| EP | 3 330 072 A1 | 6/2018 |
| JP | 62-006956 A | 1/1987 |

(Continued)

OTHER PUBLICATIONS

K.H Leong et al., "The potential of knitting for engineering composites—a review", Composites Part A, 2000, vol. 31, No. 3, pp. 197-220 (24 pages total).

*Primary Examiner* — Alexander S Thomas
(74) *Attorney, Agent, or Firm* — Sughrue Mion, PLLC

(57) ABSTRACT

A fiber structure body includes a several fiber layers stacked in a stacking direction and has a multi-axial orientation that includes axial-force directional yarns, orthogonal directional yarns, and intersecting yarns. The fiber structure body includes a flat plate portion and a bend portion that is bent to the flat plate portion and includes a surface intersecting with a surface of the flat plate portion. The axial-force directional yarns are made of continuous fiber of reinforced fiber. Of yarns that form the bend portion and are other than the axial-force directional yarns, yarns that form at least one axis of the bend portion are provided by spun yarns made of discontinuous fiber.

7 Claims, 4 Drawing Sheets

(51) Int. Cl.
  *D03D 11/00*   (2006.01)
  *D03D 15/44*   (2021.01)

(56) References Cited

U.S. PATENT DOCUMENTS

2020/0086605 A1   3/2020   Hori et al.
2021/0180221 A1   6/2021   Maki et al.

FOREIGN PATENT DOCUMENTS

| JP | 6-815 A | 1/1994 |
| JP | 4677950 B2 | 4/2011 |
| JP | 2011-202304 A | 10/2011 |
| WO | 2014034606 A1 | 3/2014 |
| WO | 2019/098083 A1 | 5/2019 |

FIBER STRUCTURE BODY AND FIBER-REINFORCED COMPOSITE MATERIAL

CROSS REFERENCE TO RELATED APPLICATIONS

This application is a National Stage of International Application No. PCT/JP2020/024277 filed Jun. 22, 2020, claiming priority based on Japanese Patent Application No. 2019-133709 filed Jul. 19, 2019, the contents of all of which are incorporated herein by reference in their entirety.

TECHNICAL FIELD

The present disclosure relates to a fiber structure body and a fiber-reinforced composite material.

BACKGROUND ART

Fiber-reinforced composite materials have been widely used as lightweight structure materials. Fiber structure bodies are used as reinforcement base materials for the fiber-reinforced composite materials. Some of the fiber-reinforced composite materials each including a fiber structure body impregnated with a matrix resin are used as the structure materials for aircrafts, automobiles, and architectures. Some of the fiber structure bodies each include a plurality of fiber layers stacking and is bound by layer binding yarns in a stacking direction.

Some of the fiber structure bodies each include a bend portion having an L shape, a U shape, or the like according to application of the fiber-reinforced composite material. In this case, the fiber structure body that has been formed into a flat-plate shape is shaped into a shape having the bend portion.

Yarns made of reinforced fiber are used for the fiber structure body. In general, the reinforced fiber hardly stretches. While the fiber structure body using the yarns made of the reinforced fiber is shaped into the shape having the bend portion, a crease may be created on the inner side of the bend portion because the yarns arranged on the outer side of the bend portion hardly stretch. If the crease is created on the inner side of the bend portion, the resin is unlikely to penetrate into the bend portion while the fiber structure body is impregnated with the resin, which is undesirable.

In a three-dimensional fiber structure body disclosed in Patent Literature 1, a direction in which thickness-direction yarns serving as layer binding yarns extend is adjusted so that the creation of the crease is reduced. The three-dimensional fiber structure body of the Patent Literature 1 includes stacked fiber layers in which yarns made of continuous fiber are arranged in at least a biaxial orientation, and thickness-direction yarns arranged in a thickness direction of the stacked fiber layers. The stacked fiber layers are formed into a tridimensional plate shape, including bend portions bent in different directions from each other, and flat plane portions continuing to the bend portions. The thickness-direction yarns of one of the flat plane portions that are adjacent to each other with one of the bend portions interposed therebetween are arranged to obliquely intersect with the fiber layers, whereas the thickness-direction yarns of the other of the flat plane portions that are adjacent to each other with the one of the bend portions interposed therebetween are arranged orthogonal to the fiber layers.

When the stacked fiber layers bound by the thickness-direction yarns are bent while compressing the stacked fiber layers in a thickness direction of the fiber layers, non-bending portions made of the continuous fiber arranged on the outer sides of the bend portions tend to displace. At that time, the thickness-direction yarns arranged in the non-bending portions move together with the continuous fiber so as to allow the displacement of the continuous fiber, which enables the three-dimensional fiber structure body to be produced by reducing the creation of the crease in the bend portions.

CITATION LIST

Patent Literature

Patent Literature 1: Japanese Patent No. 4677950

SUMMARY OF INVENTION

Technical Problem

In the three-dimensional fiber structure body of the Patent Literature 1, an intersecting angle of the thickness-direction yarns of the one of the flat plane portions that are adjacent to each other with the one of the bend portions interposed therebetween with respect to the fiber layers needs to be different from an intersecting angle of the thickness-direction yarns of the other of the flat plane portions that are adjacent to each other with the one of the bend portions interposed therebetween with respect to the fiber layers, so as to reduce the creation of the crease in the bend portions. This requires a process for preadjusting lengths of the thickness-direction yarns when the three-dimensional fiber structure body of the flat-plate shape is woven, which increases a production cost. In addition, the thickness-direction yarns to be arranged in the flat plane portions need to be positioned to have different angles from each other between the flat plane portions before the three-dimensional fiber structure body of the flat-plate shape is shaped into the shape having the bend portions, which requires a process for positioning the thickness-direction yarns and thus increases the production cost, further.

It is an objective of the present disclosure to provide a fiber structure body and a fiber-reinforced composite material capable of reducing creation of a crease in a bend portion while a production cost is reduced.

Solution to Problem

A fiber structure body to solve the above problems includes a plurality of fiber layers stacked in a stacking direction and has a multi-axial orientation that includes axial-force directional yarns arranged in parallel with each other, main axes of which extend in an axial-force direction in which a predetermined stiffness is required, orthogonal directional yarns arranged in parallel with each other, main axes of which extend in an orthogonal direction that is orthogonal to the axial-force direction and the stacking direction, and intersecting yarns arranged in parallel with each other, main axes of which extend in a different direction from the main axes of the axial-force directional yarns and the orthogonal directional yarn. The fiber structure body includes a flat plate portion, and a bend portion that is bent to the flat plate portion and includes a surface intersecting with a surface of the flat plate portion. The axial-force directional yarns are made of continuous fiber of reinforced fiber. Of yarns that form the bend portion and are other than the axial-force directional yarns, yarns that form at least one axis of the bend portion are provided by spun yarns made of discontinuous fiber.

According to the fiber structure body, the spun yarns made of the discontinuous fiber are allowed to greatly stretch when pulled, unlike yarns made of the continuous fiber arranged in one direction. Therefore, of the yarns other than the axial-force directional yarns, the yarns that form at least one axis of the bend portion are allowed to stretch when pulled while the bend portion is formed, which reduces creation of a crease caused by yarns windingly gathering on an inner side of the bend portion. This removes necessity of a process for preadjusting lengths or intersecting angles of the layer binding yarns while the fiber structure body is woven for the sake of reducing the creation of the crease in the bend portion and also removes necessity of a process for positioning the layer binding yarns while the fiber structure body is shaped for the sake of reducing the creation of the crease in the bend portion, which reduces a production cost of the fiber structure body.

In the fiber structure body, the spun yarns made of the discontinuous fiber may be provided by layer binding yarns that serve as the intersecting yarns and bind the plurality of fiber layers.

This allows the layer binding yarns to stretch while the bend portion of the fiber structure body is formed, which allows displacement of the yarns with which the layer binding yarns are engaged, reducing the creation of the crease.

The fiber structure body may include a plurality of fiber layers formed of the orthogonal directional yarns in the stacking direction. The spun yarns made of the discontinuous fiber may be provided by the orthogonal directional yarns.

In this case, the orthogonal directional yarns forming the bend portion are allowed to stretch even when the orthogonal directional yarns are pulled while the fiber structure body is shaped. This reduces the creation of the crease caused by the orthogonal directional yarns windingly gathering on the inner side of the bend portion.

The fiber structure body may include a plurality of fiber layers formed of oblique directional yarns in the stacking direction. The oblique yarns may be configured to serve as the intersecting yarns and intersect with the axial-force directional yarns and the orthogonal directional yarn. The spun yarns made of the discontinuous fiber may be provided by the oblique yarns.

This allows the oblique yarns forming the bend portion to stretch when the oblique yarns are pulled while the fiber structure body is shaped. This reduces the creation of the crease caused by the oblique yarns windingly gathering on the inner side of the bend portion.

The spun yarns made of the discontinuous fiber of the fiber structure body may be provided by twist yarns.

Since the twist yarn is twisted, the twist yarn is allowed to stretch when pulled. This further allows the yarns to stretch when pulled while the fiber structure body is shaped.

The fiber structure body may include a multi-layered fabric.

Yarns of the fiber structure body including the multi-layered fabric are easily replaceable, which allows the fiber structure body including both the axial-force directional yarns made of the continuous fiber and the spun yarns made of the discontinuous fiber to be easily woven.

A fiber-reinforced composite material to solve the above problems is the fiber-reinforced composite material formed by impregnating a fiber structure body with a matrix material. The fiber structure body is the fiber structure body according to claim 1.

According to the fiber structure body, the spun yarns made of the discontinuous fiber are allowed to greatly stretch when pulled, unlike yarns made of the continuous fiber arranged in one direction. Therefore, of the yarns other than the axial-force directional yarns, the yarns that form at least one axis of the bend portion are allowed to stretch when pulled while the bend portion is formed, resulting in reducing the creation of the crease caused by the yarns windingly gathering on the inner side of the bend portion, unlike a case where the yarns that form at least one axis of the bend portion are not allowed to stretch. This removes necessity of the process for preadjusting lengths or intersecting angles of the layer binding yarns while the fiber structure body is woven for the sake of reducing the creation of the crease in the bend portion and removes necessity of the process for positioning the layer binding yarns while the fiber structure body is shaped for the sake of reducing the creation of the crease in the bend portion, which reduces the production cost of the fiber structure body. According to the fiber-reinforced composite material including the fiber structure body used as a reinforcement base material, the creation of the crease is reduced on the inner side of the bend portion, which facilitates impregnation of resin even on the inner side of the bend portion.

Advantageous Effects of Invention

The fiber structure body and the fiber-reinforced composite material according to the present disclosure are capable of reducing the creation of the crease in the bend portion while the production cost is reduced.

DESCRIPTION OF EMBODIMENTS

First Embodiment

A fiber structure body and a fiber-reinforced composite material according to a first embodiment will now be described with reference to FIGS. 1 to 4.

Figure 1:
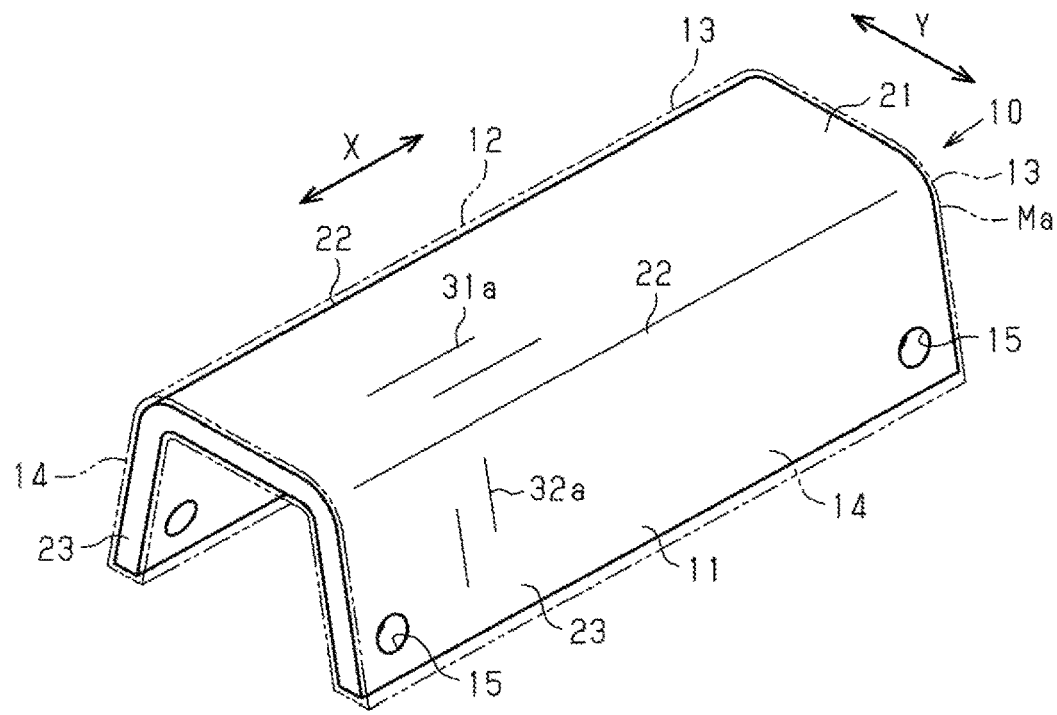
FIG. 1 is a perspective view illustrating a fiber-reinforced composite material.

As illustrated in FIG. 1, a fiber-reinforced composite material 10 is formed by impregnating a fiber structure body 11 with a matrix resin Ma, as an example of a matrix material. A thermosetting epoxy resin is used for the matrix resin Ma, for example.

The fiber-reinforced composite material 10 has a shape of a hat in section. The fiber-reinforced composite material 10 includes a top plate 12 having a rectangular flat-plate shape, bend portions 13 continuing to a pair of long edges of the top plate 12, and side plates 14 each having a rectangular flat-plate shape and continuing to an associated one of the bend portions 13. The fiber-reinforced composite material 10 includes the bend portions 13 each of which is interposed between the top plate 12 and an associated one of the side plates 14. The fiber-reinforced composite material 10 has a coupling structure connectable with other members. The coupling structure according to the present embodiment is a bolt hole 15.

The fiber structure body 11 includes a multi-layered fabric produced by multi-layer weaving. The fiber structure body 11 is formed into a tridimensional shape by forming the fiber structure body 11 having a flat-plate shape with the bend portions 13 to have a shape of a hat in section.

The fiber structure body 11 includes a first flat plate portion 21 having a rectangular flat-plate shape and forming the top plate 12 of the fiber-reinforced composite material 10, a pair of bend portions 22 forming the respective bend portions 13 of the fiber-reinforced composite material 10, and a pair of second flat plate portions 23 each having a rectangular flat-plate shape and forming a pair of the side plates 14. Each of the pair of bend portions 22 of the fiber structure body 11 is interposed between the first flat plate portion 21 and an associated one of the pair of second flat plate portions 23. Each of the bend portions 22 is bent to the first flat plate portion 21 and the associated one of the pair of second flat plate portions 23 to have a surface intersecting with a surface of the first flat plate portion 21 and a surface of the associated one of second flat plate portions 23.

Figure 2:
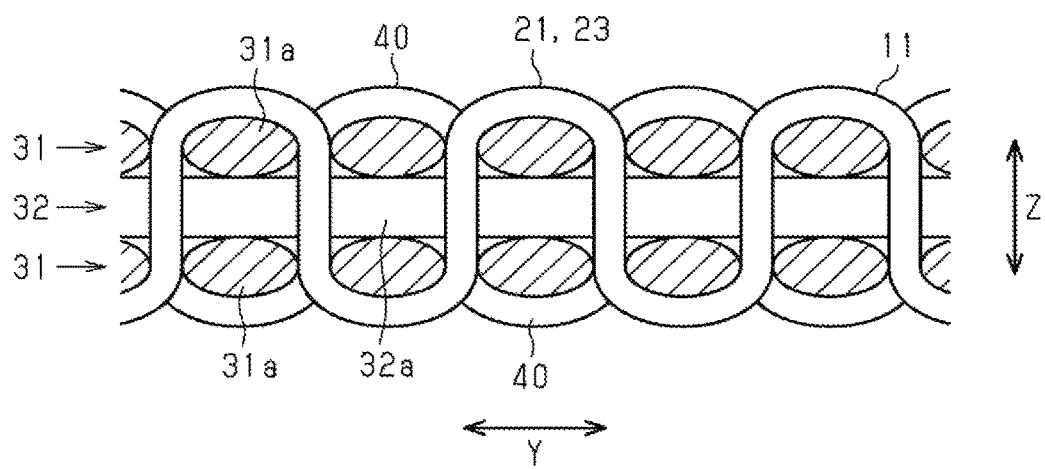
FIG. 2 is a diagrammatic view illustrating a fiber structure body according to a first embodiment.

As illustrated in FIG. 2, the fiber structure body 11 includes two warp layers 31 including a plurality of warp yarns 31a having an arrangement angle of 0 degrees, a weft layer 32 including a plurality of weft yarns 32a having an arrangement angle of 90 degrees, and layer binding yarns 40 binding the two warp layers 31 and the weft layer 32. The warp layers 31 and the weft layer 32 form fiber layers of the fiber structure body 11. The arrangement angle of 0 degrees refers to a state where the warp yarns 31a are arranged in parallel with curvature centerlines of the bend portions 22 whereas the arrangement angle of 90 degrees refers to a state where the weft yarns 32a are arranged orthogonal to the curvature centerlines of the bend portions 22. The two warp layers 31 and the single weft layer 32 of the fiber structure body 11 are alternately stacked and bound by the layer binding yarns 40, so that the warp layers 31 and the weft layer 32 that serve as the fiber layers are bound to form the fiber structure body 11 of a triaxial orientation.

Each of the warp layers 31 is formed with the plurality of warp yarns 31a arranged in parallel with each other in an orthogonal direction Y, and the weft layer 32 is formed with the plurality of weft yarns 32a arranged in parallel with each other in an axial-force direction X. The layer binding yarns 40 are arranged in parallel with each other in the axial-force direction X. Therefore, the weft yarns 32a and the layer binding yarns 40 are in parallel with each other and orthogonal to the warp yarns 31a.

A direction in which the warp layers 31 and the weft layer 32 of the fiber structure body 11 are stacked is referred to as a stacking direction Z. Therefore, the two warp layers 31 and the weft layer 32 of the fiber structure body 11 are stacked in the stacking direction Z. A direction in which main axes of the warp yarns 31a extend is referred to as the axial-force direction X whereas a direction in which main axes of the weft yarns 32a extend is referred to as the orthogonal direction Y.

Figure 3A:
FIG. 3A is a diagrammatic view illustrating a warp yarn made of continuous fiber.

As illustrated in FIG. 3A, the warp yarn 31a and the weft yarn 32a are yarns made of reinforced, continuous fiber 30. Various types of fibers may be used for the reinforced fiber, such as organic fiber, inorganic fiber, organic fibers of different types, inorganic fibers of different types, and mixed fibers of the organic fibers and the inorganic fibers. The types of the organic fibers include acrylic fiber, nylon fiber, polyester fiber, aramid fiber, poly-p-phenylene benzobisoxazole fiber, ultra-high molecular weight polyethylene fiber, and so forth. The types of the inorganic fibers include carbon fiber, glass fiber, ceramic fiber, and so forth. The warp yarns 31a and the weft yarns 32a of the present embodiment are yarns made of carbon, continuous fiber 30.

As illustrated in FIG. 1, the warp yarns 31a made of the continuous fiber 30 linearly extend in a longitudinal direction of the first flat plate portion 21 and the second flat plate portions 23 of the fiber structure body 11, which gives a predetermined stiffness in a longitudinal direction of the top plate 12 and the side plates 14 of the fiber-reinforced composite material 10. Therefore, the warp yarns 31a of the present embodiment are axial-force directional yarns, the main axes of which extend in the axial-force direction X. In other words, the warp yarns 31a are the axial-force directional yarns arranged in parallel with each other, the main axes of which extend in the axial-force direction X in which the predetermined stiffness is required.

On the other hand, the weft yarns 32a forming the first flat plate portion 21 and the second flat plate portions 23 linearly extend in a direction transverse to the longitudinal direction of the first flat plate portion 21 and the second flat plate portions 23. In other words, the weft yarns 32a are orthogonal directional yarns arranged in parallel with each other, the main axes of which extend in the orthogonal direction orthogonal to the axial-force direction X and the stacking direction Z.

Figure 4:
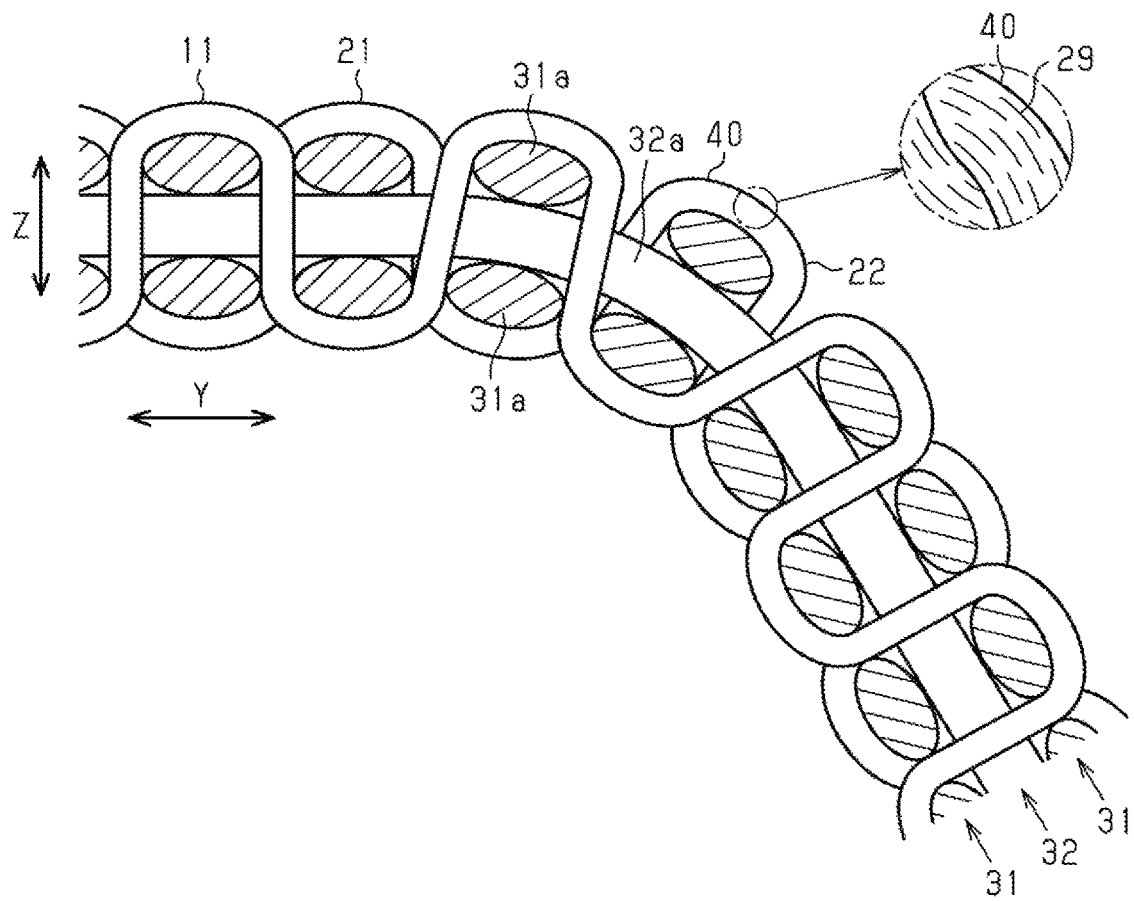
FIG. 4 is a diagrammatic view illustrating a bend portion.

In the bend portion 22 of the fiber structure body 11 as illustrated in FIG. 4, the weft yarns 32a of the weft layer 32 and the layer binding yarns 40 are bent whereas the warp yarns 31a extend in parallel with the curvature centerline of the bend portion 22. Each of the layer binding yarns 40 engages with and proceeds along one of the warp yarns 31a of one of the warp layers 31 disposed at one end of the fiber structure body 11 in the stacking direction Z, and then proceeds through the fiber structure body 11 in the stacking direction Z to the other end of the fiber structure body 11. The layer binding yarn 40 proceeds along an adjacent one, in the orthogonal direction Y, of the warp yarns 31a of the other of the warp layers 31 disposed at the other end of the fiber structure body 11 in the stacking direction Z, to the one of the warp yarns 31a, along which the layer binding yarn 40 has just proceeded, of the one of the warp layers 31 disposed at the one end of the fiber structure body 11 in the stacking direction Z. Each of the layer binding yarns 40 arranged in parallel with each other in the axial-force direction X proceeds to be engaged with any one of the warp yarns 31a at a position adjacent, in the orthogonal direction Y, to the one of the warp yarns 31a with which the each of the layer binding yarns 40 has just engaged. The layer binding yarns 40 are intersecting yarns arranged in parallel with each other, the main axes of which extend in a different direction from the main axes of the warp yarns 31a and the weft yarns 32a.

Figure 3B:
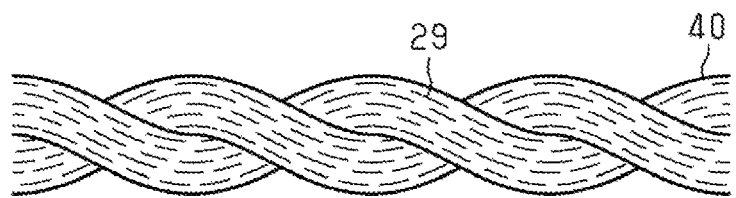
FIG. 3B is a diagrammatic view illustrating a layer binding yarn made of discontinuous fiber.

As illustrated in FIG. 3B, the layer binding yarn 40 is a twist yarn, i.e., a spun yarn, made of reinforced, discontinuous fiber 29. As the discontinuous fiber 29 for the reinforced fiber, organic fiber, inorganic fiber, organic fibers of different types, inorganic fibers of different types, or mixed fibers of the organic fibers and the inorganic fibers may be used. The types of the organic fibers include acrylic fiber, nylon fiber, polyester fiber, aramid fiber, poly-p-phenylene benzobisoxazole fiber, ultra-high molecular weight polyethylene fiber, and so forth. The types of the inorganic fibers include carbon fiber, glass fiber, ceramic fiber, and so forth. The layer binding yarns 40 of the present embodiment are formed by twisting the recycled carbon, discontinuous fiber 29. Such layer binding yarns 40 made of the discontinuous fiber 29 like the above are allowed to greatly stretch when pulled in a yarn main-axis direction, unlike yarns made of the continuous fiber 30 arranged in one direction, i.e., specifically non-twist yarns made of the continuous fiber 30.

In the present embodiment, of the weft yarns 32a and the layer binding yarns 40 that form the bend portions 22 of the fiber structure body 11 and are other than the warp yarns 31a, the layer binding yarns 40 are the spun yarns made of the discontinuous fiber 29.

A method of producing the fiber-reinforced composite material 10 will now be described, along with operational effects of the present embodiment.

The fiber structure body 11 having a flat-plate shape is shaped to form the first flat plate portion 21, the pair of bend portions 22, and the pair of second flat plate portions 23.

As illustrated in FIG. 4, when the fiber structure body 11 is bent to form each of the pair of bend portions 22, the weft yarns 32a and the layer binding yarns 40 disposed in the bend portions 22 are pulled in a direction in which the fiber structure body 11 is bent. As illustrated in an enlarged view of FIG. 4, when the layer binding yarn 40 is pulled, the layer binding yarn 40 is allowed to stretch on an outer side of each of the bend portions 22, i.e., on a side of a portion of the layer binding yarn 40 engaged with the one of the warp yarns 31a disposed at the one end of the fiber structure body 11 in the stacking direction Z. This reduces compression of each of the bend portions 22 on an inner side of each of the bend portions 22, i.e., on a side of the other end of the fiber structure body 11 in the stacking direction Z.

Then, the fiber structure body 11 is shaped, impregnated with the matrix resin Ma, and hardened to form the fiber-reinforced composite material 10. A resin transfer molding (RTM) method is used for impregnation and hardening of the matrix resin Ma. By impregnating the fiber structure body 11 with the matrix resin Ma to be hardened, the warp yarns 31a and the weft yarns 32a of the fiber structure body 11 are combined with the matrix resin Ma so that the first flat plate portion 21 is formed into the top plate 12, the bend portions 22 is formed into the bend portions 13, and the second flat plate portions 23 is formed into the side plates 14, to form the fiber-reinforced composite material 10.

The above described embodiment offers the following advantages.

(1-1) The layer binding yarns 40 of the fiber structure body 11 are the spun yarns made of the discontinuous fiber 29, which allows the layer binding yarns 40 on the outer sides of the bend portions 22 to stretch even when the layer binding yarns 40 are pulled while the fiber structure body 11 is shaped. As a result, creation of a crease on the inner side of the bend portion 22 is reduced. This removes necessity of a process for preadjusting lengths or intersecting angles of the layer binding yarns 40 while the fiber structure body 11 is woven for the sake of reducing the creation of the crease in the bend portions 22 and removes necessity of a process for positioning the layer binding yarns 40 while the fiber structure body 11 is shaped for the sake of reducing the creation of the crease in the bend portions 22, which reduce a production cost of the fiber structure body 11.

(1-2) The layer binding yarn 40 is the twist yarn, i.e., a kind of the spun yarn. Since the twist yarn is twisted, the twist yarn is allowed to stretch when pulled. This allows the layer binding yarns 40 to further stretch when pulled while the fiber structure body 11 is shaped.

(1-3) The warp yarns 31a serving as the axial-force directional yarns of the fiber structure body 11 are made of the continuous fiber 30, which ensures the predetermined stiffness in the axial-force direction of the fiber-reinforced composite material 10 for which the fiber structure body 11 is used as a reinforced base material.

(1-4) The layer binding yarns 40 are made of the discontinuous fiber 29. This allows the layer binding yarns 40 to stretch in the bend portions 22 of the fiber structure body 11, which allows, on the outer sides of the bend portions 22, displacement of the warp yarns 31a with which the layer binding yarns 40 are engaged. Therefore, the creation of the crease is reduced.

(1-5) The fiber structure body 11 includes the multi-layered fabric including the warp yarns 31a and the weft yarns 32a that are made of the continuous fiber 30, and the layer binding yarns 40 that are the spun yarns made of the discontinuous fiber 29. Yarns are easily replaceable at a loom that weaves the multi-layered fabric, and thus the loom easily weaves the fiber structure body 11 including the layer binding yarns 40 the type of which is different from the warp yarns 31a and the weft yarns 32a.

Second Embodiment

A fiber structure body and a fiber-reinforced composite material according to a second embodiment will now be described with reference to FIG. 5. In the description of the second embodiment below, detailed descriptions of components identical with those of the first embodiment described above will be omitted.

Figure 5:
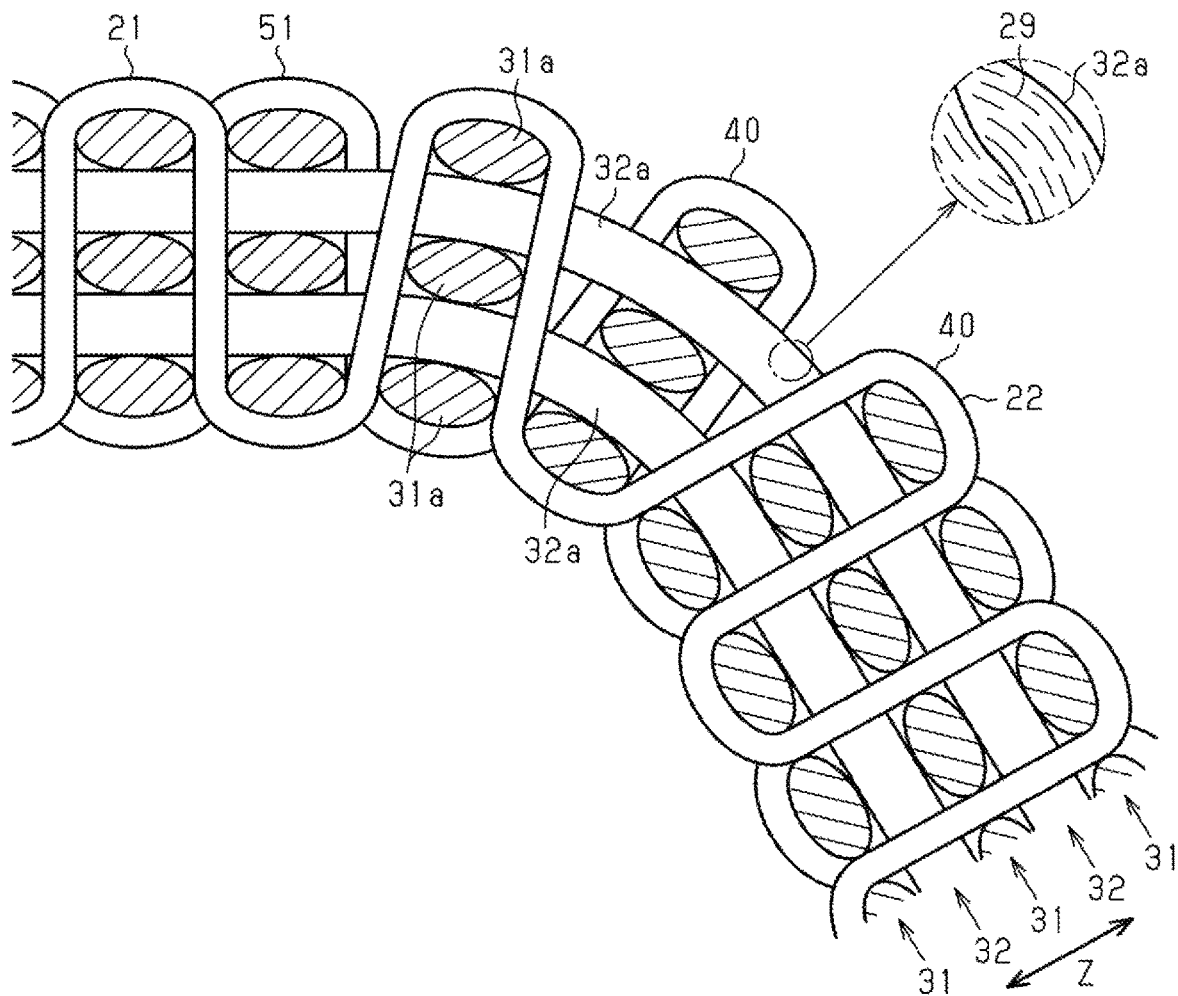
FIG. 5 is a diagrammatic view illustrating a bend portion according to a second embodiment.

As illustrated in FIG. 5, a fiber structure body 51 according to the second embodiment includes the three warp layers 31 and the two weft layers 32 that are alternately stacked in the stacking direction Z. The fiber structure body 51 includes the warp yarns 31a and the layer binding yarns 40 that are made of the continuous fiber 30, and the weft yarns 32a that are the spun yarns made of the discontinuous fiber 29. In the fiber structure body 51, the weft yarns 32a are the orthogonal directional yarns arranged in parallel with each other, the main axes of which extend orthogonal to the main axes of the warp yarns 31a and the layer binding yarns 40.

The second embodiment offers the following advantages in addition to the advantages of the first embodiment described in (1-2), (1-3), and (1-5) described above.

(2-1) The weft yarns 32a of the fiber structure body 51 are the spun yarns made of the discontinuous fiber 29. Therefore, the weft yarns 32a disposed on the outer sides of the bend portions 22 are allowed to stretch even when the weft yarns 32a are pulled while the fiber structure body 51 is shaped, as illustrated in an enlarged view of FIG. 5. As a result, the creation of the crease on the inner side of the bend portion 22 is reduced. This removes necessity of the process for preadjusting lengths or intersecting angles of the weft yarns 32a while the fiber structure body 51 is woven for the sake of reducing the creation of the crease on the inner sides of the bend portions 22, which reduce a production cost of the fiber structure body 51.

Third Embodiment

A fiber structure body and a fiber-reinforced composite material according to a third embodiment will now be described with reference to FIGS. 6 and 7. In the description of the third embodiment below, detailed descriptions of components identical with those of the first embodiment described above will be omitted.

Figure 6:
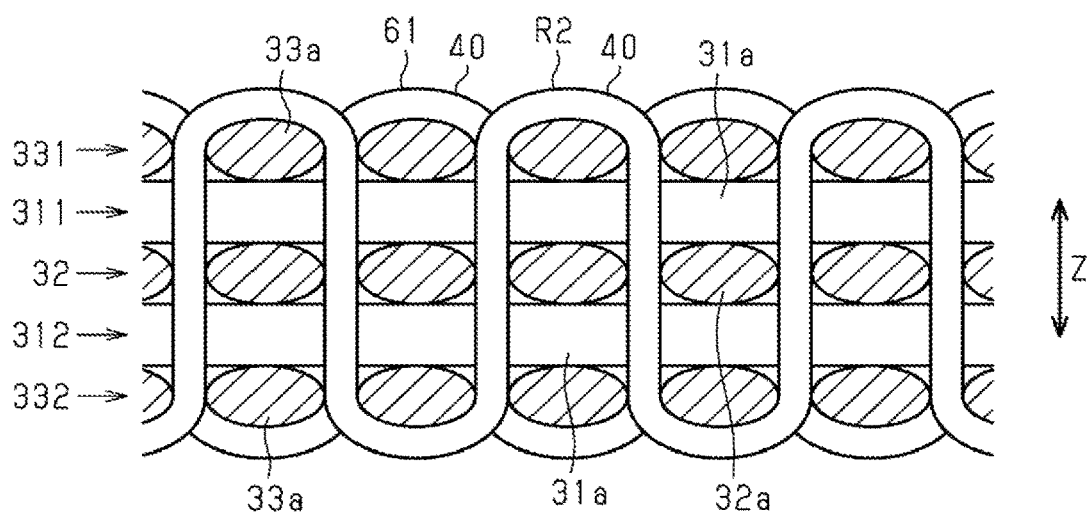
FIG. 6 is a diagrammatic view illustrating a fiber structure body according to a third embodiment.
Figure 7:
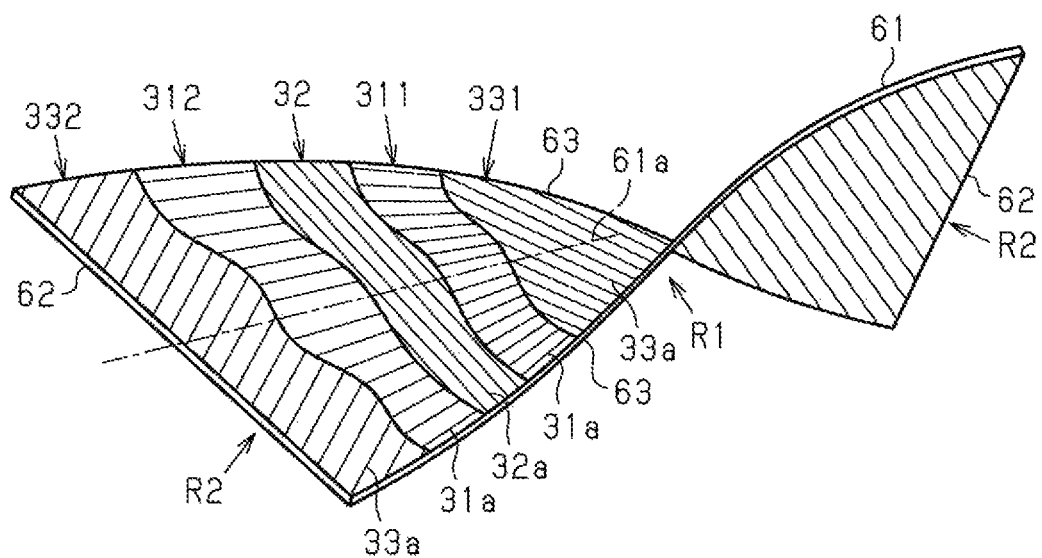
FIG. 7 is a perspective view illustrating the fiber structure body according to the third embodiment.

As illustrated in FIGS. 6 and 7, a fiber structure body 61 according to the third embodiment includes a first oblique yarn layer 331, a first warp layer 311, the weft layer 32, a second warp layer 312, and a second oblique yarn layer 332 that are stacked in this order from one end to the other end of the fiber structure body 61 in the stacking direction Z and bound by the layer binding yarns 40 in the stacking direction Z. The first oblique yarn layer 331 includes a plurality of oblique yarns 33*a* having an arrangement angle of plus 45 degrees. The first warp layer 311 and the second warp layer 312 include the plurality of warp yarns 31*a* having an arrangement angle of 0 degrees. The weft layer 32 includes the plurality of weft yarns 32*a* having an arrangement angle of 90 degrees. The second oblique yarn layer 332 includes a plurality of oblique yarns 33*a* having an arrangement angle of minus 45 degrees.

The arrangement angle of plus and minus 45 degrees refers to a state where the oblique yarns 33*a* are angled at plus and minus 45 degrees relative to the warp yarns 31*a* that has the arrangement angle of 0 degrees. The first oblique yarn layer 331, the first warp layer 311, the weft layer 32, the second warp layer 312, and the second oblique yarn layer 332 are stacked to form the fiber structure body 61 of a quintaxial orientation. All of the first oblique yarn layer 331, the first warp layer 311, the weft layer 32, the second warp layer 312, and the second oblique yarn layer 332 are the fiber layers. The oblique yarns 33*a* are the intersecting yarns arranged in parallel with each other, main axes of which extend in a different direction from the main axes of the warp yarns 31*a* and the weft yarns 32*a*.

The fiber structure body 61 further includes a bend portion R1 having a bent structure twisted around an axial line 61*a* of torsion, and a flat plate portion R2 having a flat-plate shape and continuing to the bend portion R1. The axial line 61*a* of torsion of the fiber structure body 61 has rectilinearity, passing the bend portion R1 and the flat plate portion R2 to linearly extend along a longitudinal direction of the fiber structure body 61. In the fiber structure body 61, short edges located at both ends of the axial line 61*a* of torsion are referred to as side edges 62, and long edges connecting ends of one of the two side edges 62 to ends of the other of the two side edges 62, respectively, are referred to as edges 63 of torsion.

The warp yarns 31*a* of the first warp layer 311 and the second warp layer 312 linearly extends in parallel with the axial line 61*a* of torsion. The oblique yarns 33*a* of the first oblique yarn layer 331 and the second oblique yarn layer 332 linearly extend from the axial line 61*a* of torsion toward the edges 63 of torsion, angled at plus and minus 45 degrees relative to the axial line 61*a* of torsion. The weft yarns 32*a* of the weft layer 32, intersecting with the axial line 61*a* of torsion, linearly extend from the axial line 61*a* of torsion toward the edges 63 of torsion. The layer binding yarns 40 bind the first oblique yarn layer 331, the first warp layer 311, the weft layer 32, the second warp layer 312, and the second oblique yarn layer 332 in the stacking direction Z.

The fiber structure body 61 includes the warp yarns 31*a* and the layer binding yarns 40 that are made of the continuous fiber 30, and the oblique yarns 33*a* and the weft yarns 32*a* that are the twist yarns, i.e., a kind of the spun yarns, made of the discontinuous fiber 29. The weft yarns 32*a* and the oblique yarns 33*a* of the fiber structure body 61 are yarns arranged in parallel with each other, the main axes of which extend in a different direction from the main axis of the warp yarns 31*a*.

The third embodiment offers the following advantages in addition to the advantages of the first embodiment described in (1-2), (1-3), and (1-5) described above.

(3-1) The weft yarns 32*a* and the oblique yarns 33*a* of the fiber structure body 61 are provided by the spun yarns made of the discontinuous fiber 29. Therefore, the weft yarns 32*a* and the oblique yarns 33*a* are allowed to stretch even when the weft yarns 32*a* and the oblique yarns 33*a* are pulled in the bend portion R1 bent with torsion while the fiber structure body 61 is shaped. As a result, unlike a case where the weft yarns 32*a* and the oblique yarns 33*a* are not allowed to stretch, the creation of the crease and a deformation caused by a difference in the yarn length of the weft yarn 32*a* between the inner side and the outer side of the bend portion of the fiber structure body 61 and a difference in the yarn length of the oblique yarn 33*a* between the inner side and the outer side of the bend portion of the fiber structure body 61 is reduced. This removes necessity of the process for pre-adjusting lengths of the weft yarns 32*a* and the oblique yarns 33*a* while the fiber structure body 61 is woven, which reduces a production cost of the fiber structure body 61.

The following modifications may be made to the embodiments described above. The embodiments above and the following modifications may be combined one another unless otherwise fallen into technical inconsistency.

The layer binding yarns 40 of the first embodiment, the weft yarns 32*a* of the second embodiment, and the oblique yarns 33*a* of the third embodiment may be non-twist yarns made of the discontinuous fiber 29.

The above-described embodiments use the thermosetting resin for the matrix resin Ma. However, other kinds of resins may be used, instead.

Ceramic may be used as a material for matrix, instead of the matrix resin.

The number of stacking fiber layers in any of the embodiments may be changed to any value.

The shapes of the fiber structure bodies 11, 51, and 61 need not be the shapes of a hat in section, but may be modified to any shapes as appropriate such as a tubular shape and an L shape as long as the shape includes a bend portion or a torsion.

The fiber structure bodies 11, 51, and 61 need not include a multi-layered fabric, but may include a plurality of single-layered fabrics that are stacked and bound by the layer binding yarns 40, or a knit.

REFERENCE SIGNS LIST

Ma matrix resin serving as material for matrix
R1 bend portion
R2 flat plate portion
10 fiber-reinforced composite material
11, 51, 61 fiber structure body
21 first flat plate portion
22 bend portion
23 second flat plate portion
29 discontinuous fiber
30 continuous fiber
31 warp layer serving as fiber layer
31*a* warp yarn serving as axial-force directional yarn
32 weft layer serving as fiber layer
32*a* weft yarn serving as orthogonal directional yarn
33*a* oblique yarn serving as intersecting yarn
40 layer binding yarn serving as intersecting yarn 311 first warp layer serving as fiber layer
312 second warp layer serving as fiber layer
331 first oblique yarn layer serving as fiber layer
332 second oblique yarn layer serving as fiber layer

The invention claimed is:

1. A fiber structure body including a plurality of fiber layers stacked in a stacking direction and having a multi-axial orientation, the multi-axial orientation including:
   axial-force directional yarns arranged in parallel with each other, main axes of the axial-force directional yarns extending in an axial-force direction in which a predetermined stiffness is required;
   orthogonal directional yarns arranged in parallel with each other, main axes of the orthogonal directional yarns extending in an orthogonal direction that is orthogonal to the axial-force direction and the stacking direction; and
   intersecting yarns arranged in parallel with each other, main axes of the intersecting yarns extending in a different direction from the main axes of the axial-force directional yarns and the orthogonal directional yarns, the fiber structure body comprising:
   a flat plate portion; and
   a bend portion that is bent to the flat plate portion and includes a surface intersecting with a surface of the flat plate portion, wherein
   the axial-force directional yarns are made of continuous fiber of reinforced fiber, and
   of yarns that form the bend portion and are other than the axial-force directional yarns, yarns that form at least one axis of the bend portion are provided by spun yarns made of discontinuous fiber.

2. The fiber structure body according to claim 1, wherein the spun yarns made of the discontinuous fiber are provided by layer binding yarns that serve as the intersecting yarns and bind the plurality of fiber layers.

3. The fiber structure body according to claim 1, wherein the fiber structure body includes a plurality of fiber layers formed of the orthogonal directional yarns in the stacking direction, and
the spun yarns made of the discontinuous fiber are provided by the orthogonal directional yarns.

4. The fiber structure body according to claim 1, wherein the fiber structure body includes a plurality of fiber layers formed of oblique yarns in the stacking direction, the oblique yarns being configured to serve as the intersecting yarns and intersect with the axial-force directional yarns and the orthogonal directional yarns, and
the spun yarns made of the discontinuous fiber are provided by the oblique yarns.

5. The fiber structure body according to claim 1, wherein the spun yarns made of the discontinuous fiber are provided by twist yarns.

6. The fiber structure body according to claim 1, wherein the fiber structure body includes a multi-layered fabric.

7. A fiber-reinforced composite material formed by impregnating a fiber structure body with a matrix material, wherein the fiber structure body is the fiber structure body according to claim 1.

* * * * *